US012659315B2

(12) United States Patent
Bandekar et al.

(10) Patent No.: US 12,659,315 B2
(45) Date of Patent: Jun. 16, 2026

(54) FORWARD OR DROP PACKETS IN CASE OF URPF VIOLATION AND NOTIFY CONTROLLER VIA GRPC/SFLOW/IPFIX

(71) Applicant: Arista Networks, Inc., Santa Clara, CA (US)

(72) Inventors: Vishal Bandekar, Bangalore (IN); Rashid Akhtar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 194 days.

(21) Appl. No.: 18/482,642

(22) Filed: Oct. 6, 2023

(65) Prior Publication Data

US 2025/0119431 A1 Apr. 10, 2025

(51) Int. Cl.
*H04L 9/40* (2022.01)
(52) U.S. Cl.
CPC ........ *H04L 63/101* (2013.01); *H04L 63/0236* (2013.01); *H04L 63/20* (2013.01)
(58) Field of Classification Search
CPC .... H04L 63/101; H04L 63/0236; H04L 63/20
See application file for complete search history.

(56) References Cited

U.S. PATENT DOCUMENTS

| | | | | |
|---|---|---|---|---|
| 7,349,382 B2 * | 3/2008 | Marimuthu | ........... | H04L 63/102 |
| | | | | 707/E17.035 |
| 8,473,754 B2 * | 6/2013 | Jones | ....................... | G06F 21/53 |
| | | | | 713/171 |
| 9,038,151 B1 * | 5/2015 | Chua | ....................... | H04L 63/02 |
| | | | | 726/1 |
| 9,237,158 B2 * | 1/2016 | Smith | ..................... | H04L 45/54 |
| 10,868,748 B1 * | 12/2020 | Ramabadran | ........... | H04L 43/50 |
| 11,563,668 B1 * | 1/2023 | Ramabadran | ......... | H04L 63/101 |
| 2005/0055573 A1 * | 3/2005 | Smith | ................. | G06F 21/6218 |
| | | | | 726/4 |
| 2005/0138019 A1 * | 6/2005 | Betts | ....................... | H04L 45/30 |
| 2006/0117058 A1 * | 6/2006 | Smith | ................... | H04L 63/105 |
| | | | | 707/999.102 |
| 2020/0007583 A1 * | 1/2020 | Dixit | ..................... | H04L 63/102 |
| 2020/0007584 A1 * | 1/2020 | Dixit | ................... | H04L 41/5019 |
| 2022/0417287 A1 * | 12/2022 | Joshi | ................... | H04L 63/0236 |
| 2025/0039136 A1 * | 1/2025 | Lake | ................... | G06F 11/3636 |

OTHER PUBLICATIONS

Cisco (Security Configuration Guide: Unicast Reverse Path Forwarding Cisco IOS XE Release 3S (Cisco ASR 903), 24 pages, 2022) (Year: 2022).*

* cited by examiner

*Primary Examiner* — Oleg Korsak
(74) *Attorney, Agent, or Firm* — Sprinkle IP Law Group

(57) ABSTRACT

A method for handling a unicast reverse-path forwarding (uRPF) violation can include, at a network device residing on a network: receiving an incoming packet from a source Internet Protocol (IP) address, the incoming packet having a destination IP address, the network device comprising an application-specific integrated circuit (ASIC) chip; performing an uRPF check on the incoming packet; and responsive to the incoming packet failing the uRPF check, notifying a network controller external to the network device. The network controller is operable to determine, based on a rule or by searching a routing information base (RIB), whether a flow from the source IP address to the designation IP address is legitimate and, in accordance with a result from the determination, drop the incoming packet or forward the incoming packet to the destination IP address.

20 Claims, 7 Drawing Sheets

THIS PACKET WILL BE DROPPED IN
ASIC IN CASE OF uRPF FAILURE

PACKET WILL BE DROPPED IN ASIC AND
CONTROLLER WILL BE NOTIFIED FOR uRPF FAILURE.
CONTROLLER MAY TAKE THE CALL TO DROP PACKET
OR ADD A POLICY ON THIS NETWORK DEVICE FOR
THE SOURCE TO GET THE PACKET FORWARDED

PACKET WILL BE FORWARDED IN ASIC
AND CONTROLLER WILL BE NOTIFIED FOR
uRPF FAILURE. CONTROLLER MAY TAKE
THE CALL TO DROP PACKET OR CONTINUE
WITH FORWARDING THE PACKET

FORWARD OR DROP PACKETS IN CASE OF URPF VIOLATION AND NOTIFY CONTROLLER VIA GRPC/SFLOW/IPFIX

TECHNICAL FIELD

This disclosure relates generally to network packet processing. More particularly, this disclosure relates to systems and methods for forwarding or dropping packets in case of Unicast reverse-path forwarding violation.

BACKGROUND OF THE RELATED ART

Unicast reverse-path forwarding (uRPF) is a security feature that can be installed on a network device such as a router or a switch to limit malicious traffic on a network. A uRPF check performs a forwarding table lookup on an Internet Protocol (IP) packet's source address, and checks the incoming interface.

An issue here is that this validation may not be completely accurate and, as a result, may produce false positives. On the one hand, if the uRPF feature is not enabled, attacks can come from illegitimate users/hosts/IP addresses. On the other hand, if the uRPF feature is enabled, then there is a risk of dropping packets originated from a legitimate source for a certain period of time before the network device learns that the source is indeed legitimate. If the network device does not learn fast enough or at all, a significant amount of legitimate packets could be dropped. This is not desired at all in some cases as some sources such as virtual machines (VMs), applications, hosts, etc. can be very dynamic in nature.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Specific embodiments will now be described with reference to the accompanying figures (FIGS). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Some network devices (e.g., routers, switches, access points, firewalls, gateways, networking equipment, etc.) have two modes of operation-a strict mode and a loose mode. Such a network device makes a determination as to whether an incoming packet is arriving from a path or route that a sender would use to reach a destination in these two modes.

In the strict mode, a source IP address should be reachable via the same interface on which the packet came. In the loose mode, a source IP address can be reachable via any interface. If the source IP address is validated, the network device forwards the incoming packet to the destination address. Otherwise, the network device drops the incoming packet, thus preventing IP spoofing from presumably illegitimate/invalid sources. This validation (and hence packet forwarding or dropping) usually takes place in an application-specific integrated circuit (ASIC) chip of the network device.

Figure 2:
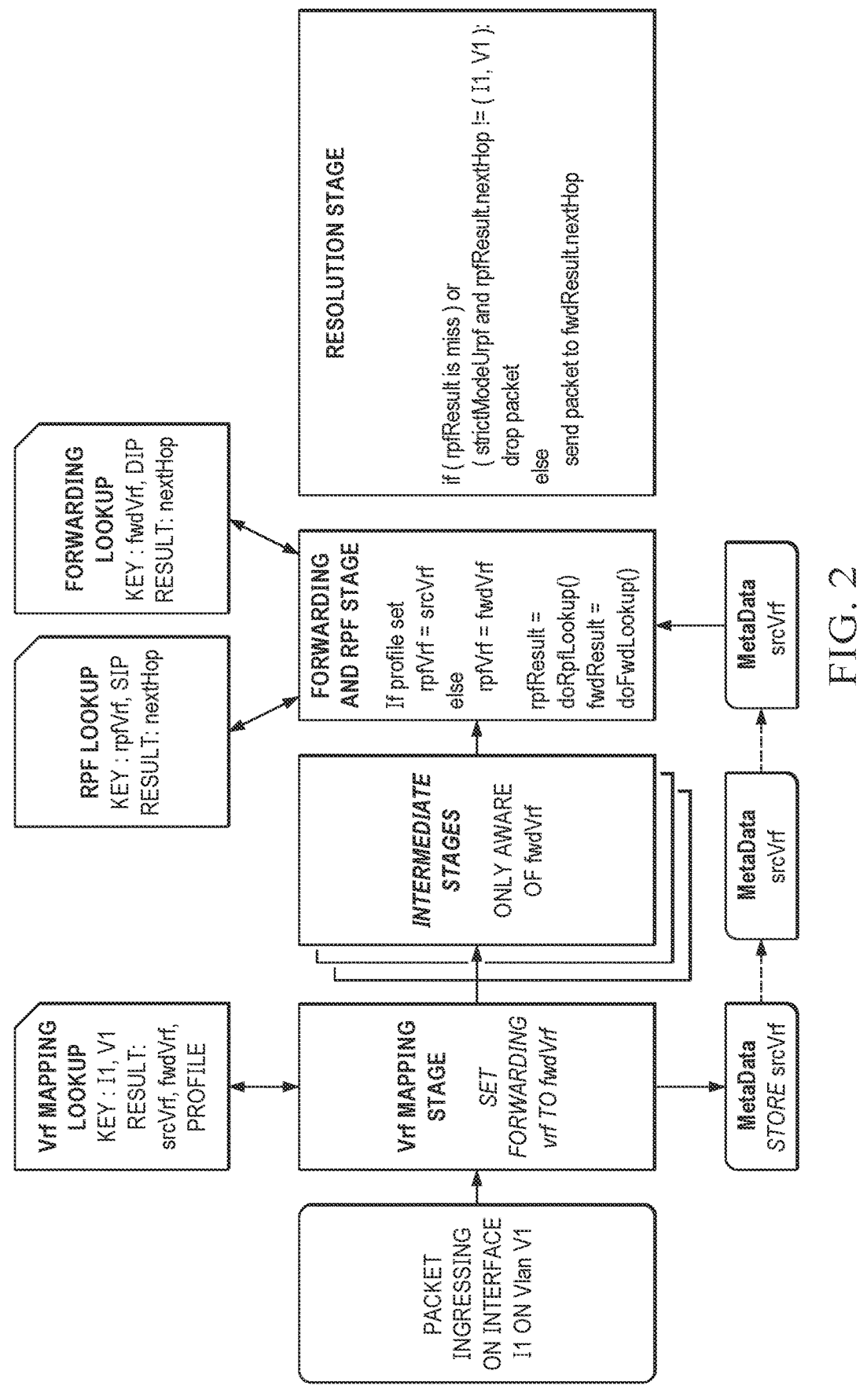
FIG. 2 is an internal system diagram that illustrates the current behavior in a system shown in FIG. 1 in which all packets are dropped in case of a uRPF violation.

As discussed above, uRPF is a security feature that can validate the source IP address of an incoming packet to ensure that the incoming packet has originated from a legitimate/valid source. With the uRPF feature enabled, a uRPF check is performed on each incoming packet by logic executing on the network device. The uRPF check can entail searching a forwarding table for a packet's source IP address and checks the incoming interface. FIG. 2 generally illustrates how such lookups are performed. If validation of the source IP address fails, then the packet is dropped, thus preventing IP spoofing from illegitimate/invalid sources. However, this validation may not be completely accurate and, as a result, may produce false positives.

If the uRPF feature is not enabled on the network device, it faces attacks from illegitimate users/hosts/IPs. However, if the uRPF feature is enabled, the network device faces the risk of dropping packets from a legitimate source for a certain period of time until the legitimate source is learned. If the network device does not learn such sources (e.g., hosts), the network device will be dropping all the packets from legitimate hosts. That is not desired at all in some cases as VMs/applications/hosts are very dynamic in nature.

To this end, a new behavior for the uRPF feature is needed to reduce or eliminate the risk of dropping packets originated from legitimate sources.

The invention disclosed herein provides a network controller that can implement the new behavior via two solutions in case of uRPF violations.

A first solution entails dropping packets that violate the uRPF check and notify the network controller. This allows the network controller to decide whether or not to install that source IP address to the networking equipment. The network controller is programmed to determine whether or not to install the source IP address in a routing information base (RIB) in the incoming interface Virtual Routing and Forwarding (VRF) based on the legitimacy of the source. VRF acts as a logical router and requires a forwarding table that designates the next hop for each packet, lists devices that can be called upon to forward the packet, and includes rules and routing protocols that govern how the packet is to be forwarded. In this case, there will be a brief drop until the route is added to the RIB by the controller. The first solution is further described below.

A second solution entails forwarding packets that violate the uRPF check and notifying the network controller. This allows the network controller to implement a rule in the system to drop illegitimate packets. For example, after discovering an illegitimate source IP address, the controller can apply an ACL or policy so that the packets originating from that source IP address will be dropped. The second solution is further described below.

In both cases, attacks in the system can be avoided. This gives the network controller a flexibility to either provision new devices being added to the network or block an illegitimate device.

As a non-limiting example, the network controller or control logic can be implemented as an application that is part of the automation that manages a data center and that connects to the network device via a secure connection. The network controller may be monitored by a network administrator at the data center.

In some embodiments, the first solution entails dropping packets that violate the uRPF check and notifying a network controller external to the network device (e.g., through a high performance remote procedure call such as gRPC, sampled flow such as sFlow®, IP Flow Information Export (IPFIX), etc.). As alluded to above, the network controller is programmed to determine whether or not to install that source IP in the RIB in the incoming interface VRF or Split VRF. Split VRF is explained below.

Depending on the use case, VRF can be normal or split. For a normal uRPF case, uRPF lookup is conducted using the incoming interface VRF. For a split-VRF uRPF case, a (src) VRF is provided, which is explicitly populated (via BGP or some routing protocol) with legitimate prefixes for source addressed traffic. The srcVRF is used for uRPF resolution, as illustrated in FIG. 2.

Figure 1:
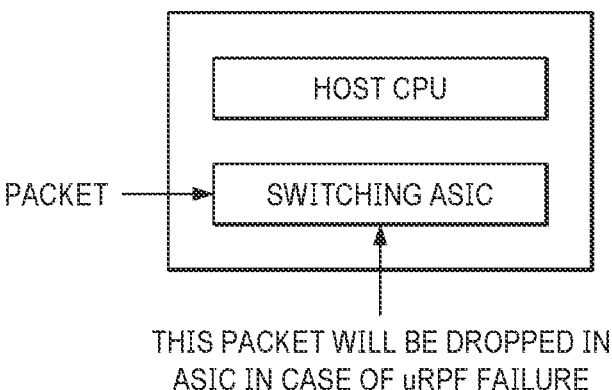
FIG. 1 depicts a diagrammatic representation of a system that drops incoming packets in case of a uRPF violation without further action.

For comparison, FIG. 1 is a diagram that illustrates the current behavior in a system shown in FIG. 2 in which all packets are dropped in case of a uRPF violation. After the incoming packets are dropped, no further actions are taken.

Figure 3:
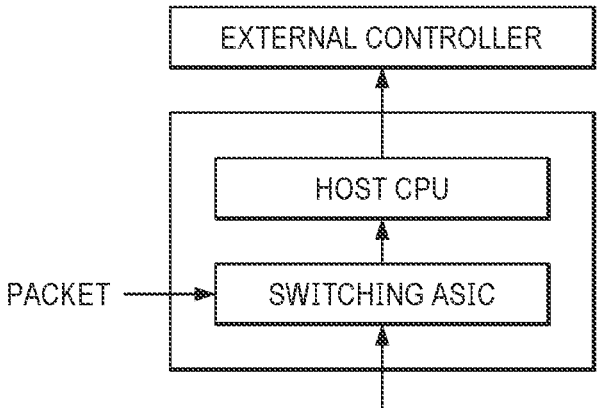
FIG. 3 is a diagram that shows the first proposed behavior of a system that drops an incoming packet for a certain amount of time in case of a uRPF violation and notifies an external network controller according to some embodiments disclosed herein.
Figure 4:
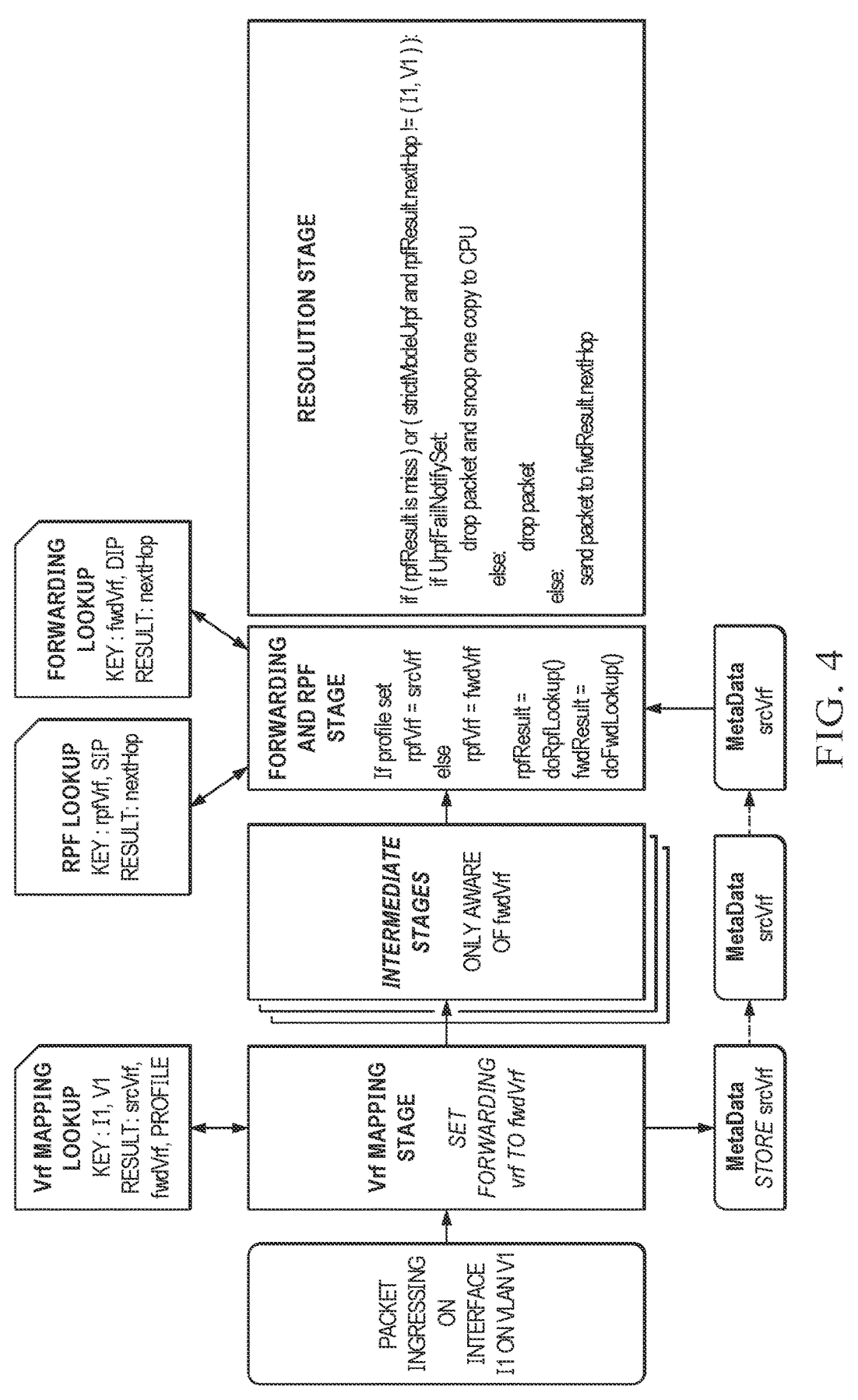
FIG. 4 is an internal system diagram that illustrates the first proposed behavior of a system shown in FIG. 3 in which all packets are dropped in case of a uRPF violation and the controller is notified to take further action.

FIG. 3 is a diagram that shows the system of FIG. 4 dropping an incoming packet in case of a uRPF violation and notifying an external network controller accordingly. This is further shown in FIG. 4 where traffic which results in a source IP address lookup miss in the desired VRF is dropped. Later, the network controller can add a policy on the network device to forward the packet from this specific source if it is legitimate. With this solution, there can be a brief amount of time where legitimate traffic gets dropped, before the network controller adds the source IP address in the desired VRF via some ACL/policy. This is the first proposed solution.

Below is a non-limiting example that illustrates the first solution for uRPF resolution:

```
if ( rpfResult is miss ) or ( strictModeUrpf and rpfResult.nextHop != ( I1,
V1 ) ):
    if UrpfFailNotifySet:
        drop packet and snoop one copy to CPU to notify controller
    else:
        drop packet
else:
    send packet to fwdResult.nextHop
```

In some embodiments, the second solution entails forwarding packets that violate the uRPF check and notifying the network controller. In this case, the network controller is programmed to enforce a rule that drops illegitimate packets. For example, after discovering an illegitimate IP address, the network controller can apply an access control list (ACL) or policy so that further packets originating from that illegitimate IP address are dropped. This is the second proposed solution.

Figure 5:
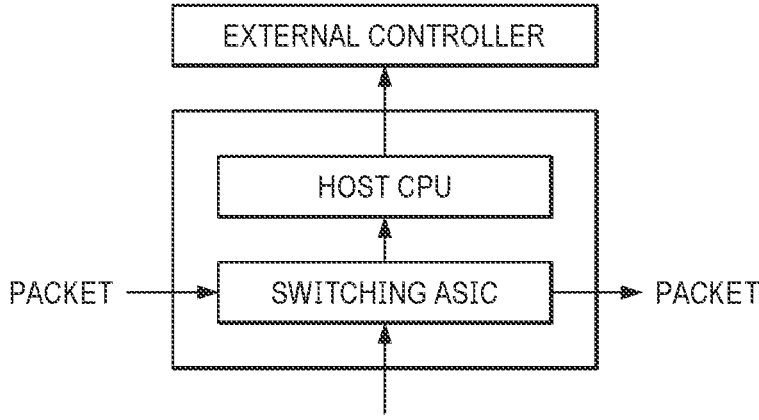
FIG. 5 is a diagram that shows the second proposed behavior of a system that forwards an incoming packet in case of a uRPF violation and notifies an external network controller according to some embodiments disclosed herein.
Figure 6:
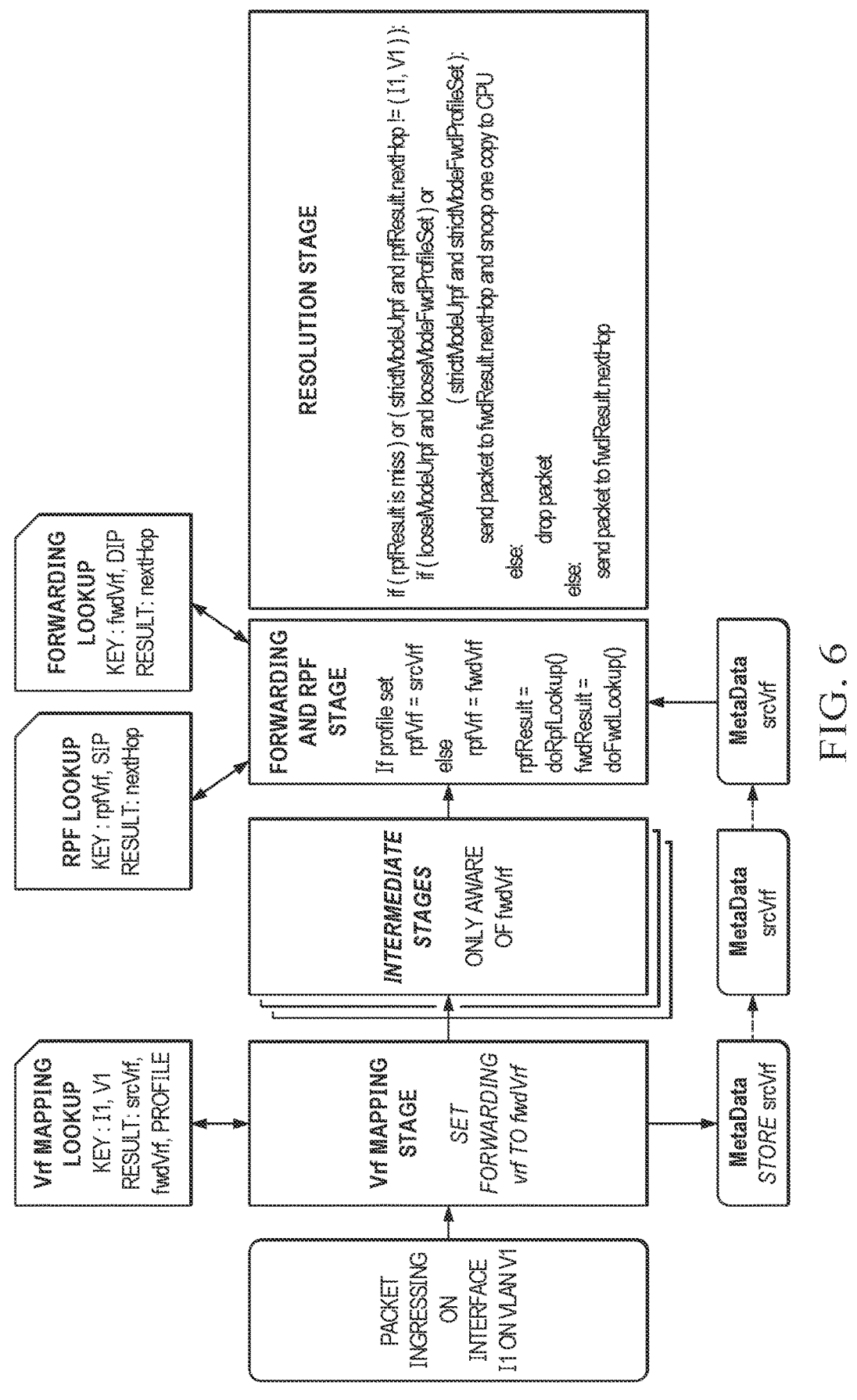
FIG. 6 is an internal system diagram that shows the second proposed behavior of a system shown in FIG. 5 that forwards an incoming packet, even if a uRPF check on a source IP address of the incoming packet is violated, and notifies an external network controller according to some embodiments disclosed herein.

This behavior is illustrated in FIG. 5 and FIG. 6, which show that packets from a source IP address will be forwarded, even if a uRPF check on the source IP address is violated. The network controller is notified of this source IP address. If an unsafe flow is detected by the network controller, the controller can program the network device to drop it.

Below is a non-limiting example that illustrates the second solution for uRPF resolution:

```
if ( rpfResult is miss ) or ( strictModeUrpf and rpfResult.nextHop != ( I1,
V1 ) ):
    if ( looseModeUrpf and looseModeFwdProfileSet ) or
        ( strictModeUrpf and strictModeFwdProfileSet ):
        send packet to fwdResult.nextHop and snoop one copy to CPU
    else:
        drop packet
else:
    send packet to fwdResult.nextHop
```

Currently, the network device drops uRPF violation flow without alerting a network controller. To prevent permanent traffic loss due to a uRPF violation for legitimate users, it can be crucial to have a network controller determine whether the flow is legitimate as data center technology evolves and new VMs/applications are added to the network dynamically.

Further, currently, uRPF is only used to drop the packets. The invention disclosed herein can enhance uRPF to satisfy different use cases. For instance, enterprises can use a solution disclosed herein to avoid attacks as well as to isolate bad flows. Other implementations and uses may also be possible.

The new solutions described above with reference to FIGS. 3-6 can both prevent attacks, such as IP spoofing, to the network device. The network controller can safely provision new network devices added to the network and/or effectively block an illegitimate device from sending packets to the network. In this way, the risk of dropping legitimate flows due to a uRPF violation can be eliminated.

Figure 7:
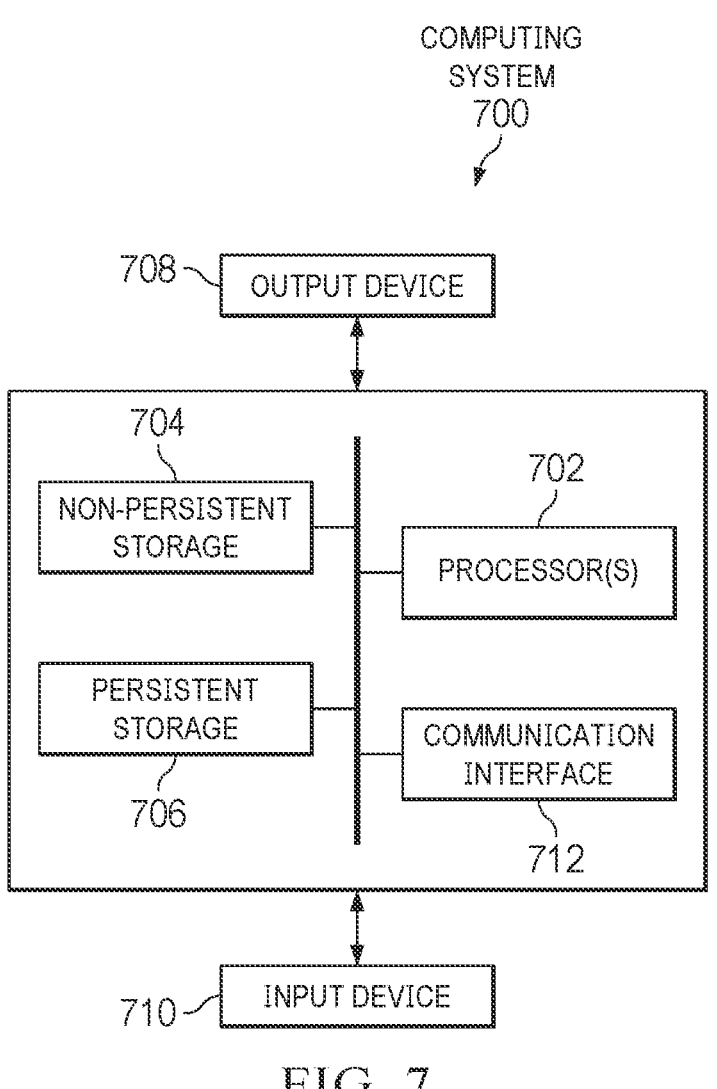
FIG. 7 shows a diagrammatic representation of a computing device for implementing some embodiments disclosed herein.

As discussed above, embodiments disclosed herein may be implemented using computing devices. FIG. 7 shows a diagrammatic representation of a computing device in accordance with some embodiments disclosed herein. Computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), communication interface (712) (e.g., Bluetooth® interface, infrared interface, network interface, optical interface, etc.), input devices (710), output devices (708), and numerous other elements (not shown) and functionalities. Each of these components is described below.

In one embodiment disclosed herein, computer processor(s) (702) may be an integrated circuit for processing instructions. For example, the computer processor(s) may be one or more cores or micro-cores of a processor. Computing system (700) may also include one or more input devices (710), such as a touchscreen, keyboard, mouse, microphone, touchpad, electronic pen, or any other type of input device. Further, communication interface (712) may include an integrated circuit for connecting computing system (700) to a network (not shown) (e.g., a local area network (LAN), a wide area network (WAN) such as the Internet, mobile network, or any other type of network) and/or to another device, such as another computing device.

In one embodiment disclosed herein, computing system (700) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (702), non-persistent storage (704), and persistent storage (706). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for handling a unicast reverse-path forwarding (uRPF) violation, the method comprising:

at a network device residing on a network:

receiving an incoming packet from a source Internet Protocol (IP) address, the incoming packet having a destination IP address, the network device comprising an application-specific integrated circuit (ASIC) chip;

performing an uRPF check on the incoming packet; and responsive to the incoming packet failing the uRPF check, notifying a network controller external to the network device, wherein the network controller is operable to determine, based on a rule or by searching a routing information base (RIB), whether a flow from the source IP address to the destination IP address is legitimate and, in accordance with a result from the determination, drop the incoming packet if the result agrees with the uRPF check or forward the incoming to the destination IP address if the result disagrees with the uRPF check.

2. The method according to claim 1, wherein, responsive to the incoming packet failing the uRPF check, the network device drops the incoming packet in the ASIC chip and performs the notifying the network controller and wherein, if the result from the determination disagrees with the uRPF check, traffic from the source IP address is dropped until the flow is added by the network controller to the RIB.

3. The method according to claim 1, wherein, responsive to the incoming packet failing the uRPF check, the network device forwards the incoming packet to a next hop designated in a forwarding table per a logical router on the network device and performs the notifying the network controller and wherein, if the result from the determination agrees with the uRPF check, the source IP address is added to an access control list (ACL) or policy so that further packets originating from the source IP address are dropped.

4. The method according to claim 1, wherein the network controller is further operable to, responsive to finding the flow from the source IP address to the designation IP address being illegitimate, applying an access control list (ACL) or policy so that further packets originating from the source IP address are dropped.

5. The method according to claim 1, wherein the network controller is further operable to determine whether to add the source IP address to the RIB.

6. The method according to claim 1, wherein the network controller comprises an application executing on a computing device external to the network device, the application communicatively connected to the network device over a secure connection.

7. The method according to claim 6, wherein the application is part of an automation that manages a data center.

8. A system for handling a unicast reverse-path forwarding (uRPF) violation, the system comprising:
   a network device residing on a network, the network device comprising:
      a processor;
      a non-transitory computer-readable medium; and
      instructions stored on the non-transitory computer-readable medium and translatable by the processor for:
         receiving an incoming packet from a source Internet Protocol (IP) address, the incoming packet having a destination IP address, the network device comprising an application-specific integrated circuit (ASIC) chip;
         performing an uRPF check on the incoming packet; and
         responsive to the incoming packet failing the uRPF check, notifying a network controller external to the network device, wherein the network controller is operable to determine, based on a rule or by searching a routing information base (RIB), whether a flow from the source IP address to the destination IP address is legitimate and, in accordance with a result from the determination, drop the incoming packet if the result agrees with the uRPF check or forward the incoming to the destination IP address if the result disagrees with the uRPF check.

9. The system of claim 8, wherein, responsive to the incoming packet failing the uRPF check, the network device drops the incoming packet in the ASIC chip and performs the notifying the network controller and wherein, if the result from the determination disagrees with the uRPF check, traffic from the source IP address is dropped until the flow is added by the network controller to the RIB.

10. The system of claim 8, wherein, responsive to the incoming packet failing the uRPF check, the network device forwards the incoming packet to a next hop designated in a forwarding table per a logical router on the network device and performs the notifying the network controller and wherein, if the result from the determination agrees with the uRPF check, the source IP address is added to an access control list (ACL) or policy so that further packets originating from the source IP address are dropped.

11. The system of claim 8, wherein the network controller is further operable to, responsive to finding the flow from the source IP address to the designation IP address being illegitimate, applying an access control list (ACL) or policy so that further packets originating from the source IP address are dropped.

12. The system of claim 8, wherein the network controller is further operable to determine whether to add the source IP address to the RIB.

13. The system of claim 8, wherein the network controller comprises an application executing on a computing device external to the network device, the application communicatively connected to the network device over a secure connection.

14. The system of claim 13, wherein the application is part of an automation that manages a data center.

15. A computer program product for handling a unicast reverse-path forwarding (uRPF) violation, the computer program product comprising a non-transitory computer-readable medium storing instructions translatable by a processor of a network device residing on a network for:
   receiving an incoming packet from a source Internet Protocol (IP) address, the incoming packet having a destination IP address, the network device comprising an application-specific integrated circuit (ASIC) chip;
   performing an uRPF check on the incoming packet; and
   responsive to the incoming packet failing the uRPF check, notifying a network controller external to the network device, wherein the network controller is operable to determine, based on a rule or by searching a routing information base (RIB), whether a flow from the source IP address to the destination IP address is legitimate and, in accordance with a result from the determination, drop the incoming packet if the result agrees with the uRPF check or forward the incoming to the destination IP address if the result disagrees with the uRPF check.

16. The computer program product of claim 15, wherein, responsive to the incoming packet failing the uRPF check, the network device drops the incoming packet in the ASIC chip and performs the notifying the network controller and wherein, if the result from the determination disagrees with the uRPF check, traffic from the source IP address is dropped until the flow is added by the network controller to the RIB.

17. The computer program product of claim 15, wherein, responsive to the incoming packet failing the uRPF check, the network device forwards the incoming packet to a next hop designated in a forwarding table per a logical router on the network device and performs the notifying the network controller and wherein, if the result from the determination agrees with the uRPF check, the source IP address is added to an access control list (ACL) or policy so that further packets originating from the source IP address are dropped.

18. The computer program product of claim 15, wherein the network controller is further operable to, responsive to finding the flow from the source IP address to the designation IP address being illegitimate, applying an access control list (ACL) or policy so that further packets originating from the source IP address are dropped.

19. The computer program product of claim 15, wherein the network controller is further operable to determine whether to add the source IP address to the RIB.

20. The computer program product of claim 15, wherein the network controller comprises an application executing on a computing device external to the network device, the application communicatively connected to the network device over a secure connection.

* * * * *